US011170011B2

(12) United States Patent
Kraning et al.

(10) Patent No.: US 11,170,011 B2
(45) Date of Patent: Nov. 9, 2021

(54) TRIGGERED SCANNING USING PROVIDED CONFIGURATION INFORMATION

(71) Applicant: Palo Alto Networks, Inc., Santa Clara, CA (US)

(72) Inventors: Matthew Kraning, San Francisco, CA (US); Timothy Junio, San Francisco, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 144 days.

(21) Appl. No.: 15/463,963

(22) Filed: Mar. 20, 2017

(65) Prior Publication Data

US 2018/0268034 A1    Sep. 20, 2018

(51) Int. Cl.
*G06F 16/2458* (2019.01)
*G06F 16/2455* (2019.01)
*H04L 29/06* (2006.01)

(52) U.S. Cl.
CPC ...... *G06F 16/2471* (2019.01); *G06F 16/2455* (2019.01); *H04L 63/0227* (2013.01); *H04L 63/1408* (2013.01)

(58) Field of Classification Search
CPC ........................... G06F 17/30545; H04L 67/02
USPC ........................................................ 709/220
See application file for complete search history.

(56) References Cited

U.S. PATENT DOCUMENTS

| | | | |
|---|---|---|---|
| 6,088,804 A * | 7/2000 | Hill | G06F 21/552 726/25 |
| 8,966,625 B1 | 2/2015 | Zuk et al. | |
| 9,009,834 B1 | 4/2015 | Ren | |
| 9,749,336 B1 | 8/2017 | Zhang et al. | |
| 2002/0157021 A1 | 10/2002 | Sorkin | |
| 2003/0097588 A1 | 5/2003 | Fischman et al. | |
| 2005/0010821 A1* | 1/2005 | Cooper | H04L 63/1433 726/4 |
| 2006/0291446 A1 | 12/2006 | Caldwell | |
| 2009/0249482 A1 | 10/2009 | Sarathy | |
| 2011/0277034 A1* | 11/2011 | Hanson | H04L 63/1433 726/25 |
| 2013/0028259 A1 | 1/2013 | Cohen et al. | |
| 2013/0097588 A1* | 4/2013 | Bates | G06F 11/362 717/124 |
| 2014/0047546 A1* | 2/2014 | Sidagni | G06F 21/577 726/25 |
| 2014/0157370 A1 | 6/2014 | Plattner et al. | |
| 2014/0181975 A1 | 6/2014 | Spernow | |
| 2015/0261955 A1 | 9/2015 | Huang | |
| 2016/0044054 A1 | 2/2016 | Stiansen et al. | |
| 2016/0057101 A1* | 2/2016 | Hugard, IV | H04L 63/105 709/220 |

(Continued)

OTHER PUBLICATIONS

European Search Report dated Oct. 27, 2020 for PCT Application No. PCT/US2017/065427, 10 pages.

(Continued)

*Primary Examiner* — Umar Cheema
*Assistant Examiner* — Patrick F Ngankam
(74) *Attorney, Agent, or Firm* — Gilliam IP PLLC

(57) ABSTRACT

A system for an event driven query includes an input interface and a processor. The input interface is configured to receive an indication from a client system. The processor is configured to determine a scanning query based at least in part on the indication; and perform the scanning query.

21 Claims, 7 Drawing Sheets

(56) References Cited

U.S. PATENT DOCUMENTS

2016/0248800 A1 8/2016 Ng
2017/0310699 A1* 10/2017 Gilbert ................ H04L 63/1416

OTHER PUBLICATIONS

Tiilikainen, Seppo, "Improving the National Cyber-security by Finding Vulnerable Industrial Control Systems from the Internet", School of Electrical Engineering, Aalto University, URL: https://aaltodoc.aalto.fi/bitstream/handle/123456789/12918/master, 72 pages.

* cited by examiner

TRIGGERED SCANNING USING PROVIDED CONFIGURATION INFORMATION

BACKGROUND OF THE INVENTION

Internet connected assets (e.g., computers, mobile devices, server systems, client systems, internet-of-things devices, etc.) comprise computing systems in communication with the Internet. Internet connected assets commonly include one or more publicly addressable communication ports, allowing any Internet connected device to query the asset. Some devices allow a range of connection types (e.g., hypertext transfer protocol (HTTP) connections, secure hypertext transfer protocol (HTTPS) connections, file transfer protocol (FTP) connections, secure file transfer protocol (FTPS) connections, telnet connections, secure shell (SSH) connections, etc.) over the one or more publicly accessible ports. Internet connected assets can include a wide range of different types of hardware devices running a wide range of software including a wide range of configuration options, creating a myriad of possibilities for security vulnerabilities. A typical systems administrator may not be aware of every detail of every system under his or her watch, creating a problem where system vulnerabilities may go undetected and unfixed. When a system change occurs (e.g., a system administrator change to fix a detected system vulnerability), it can be difficult for the system administrator to have full confidence that there are no remaining vulnerabilities in the changed system (e.g., that a system fix succeeded in fixing all vulnerabilities, that a system change did not create new vulnerabilities, etc.).

BRIEF DESCRIPTION OF THE DRAWINGS

Various embodiments of the invention are disclosed in the following detailed description and the accompanying drawings.

DETAILED DESCRIPTION

Figure 1:
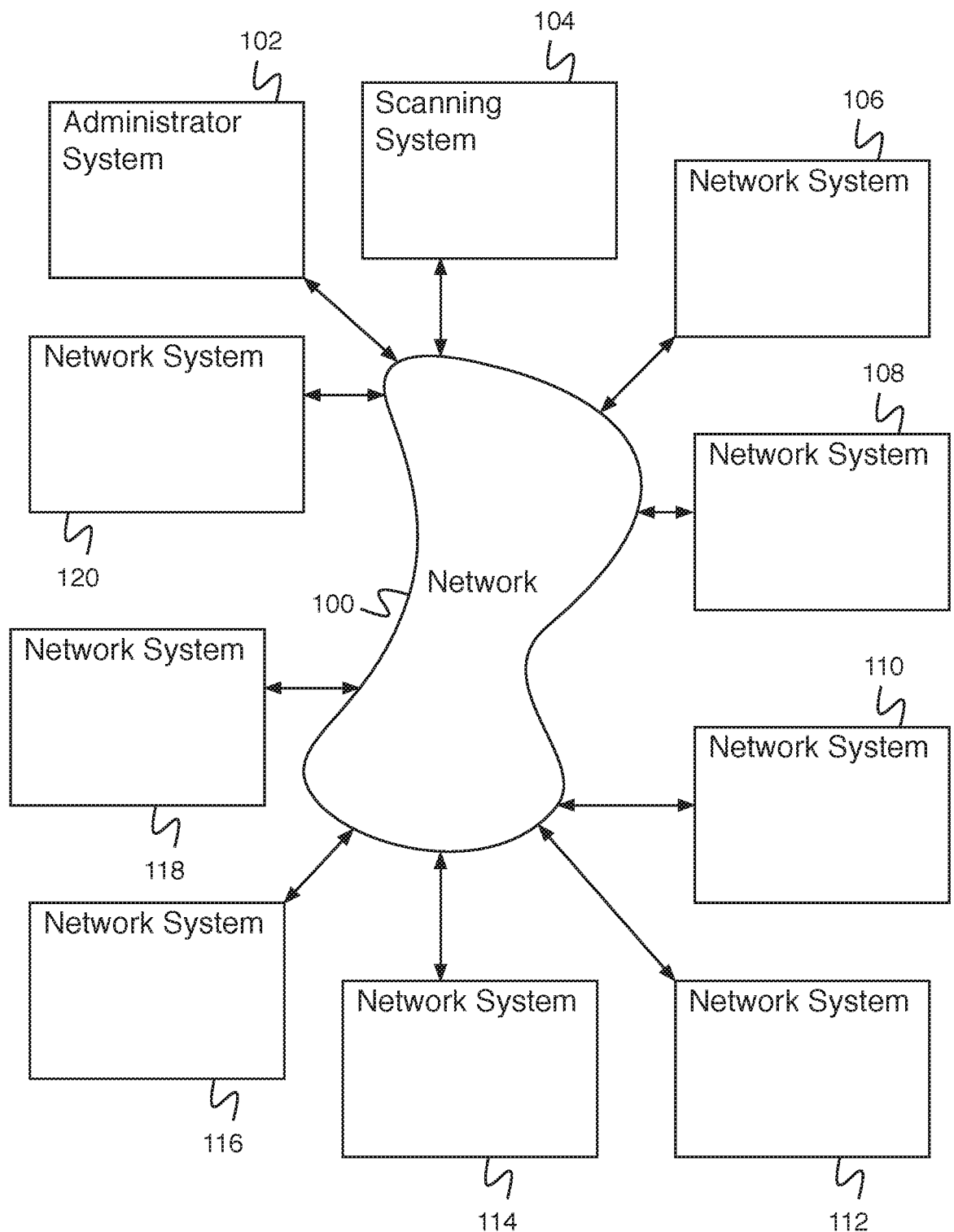
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for an event driven query comprises an input interface to receive an indication from a client system, and a processor to determine a scanning query based at least in part on the indication and perform the scanning query. In some embodiments, the system for an event driven query comprises a memory coupled to the processor and configured to provide the processor with instructions.

In some embodiments, a system for an event driven query comprises a system for performing a scan in response to an indication from a client system. In some embodiments, an indication from a client system comprises an indication of a change. In various embodiments, an indication from a client system comprises a manual indication, an automatic indication, an indication of a problem, an indication of a fixed problem, an indication of an attack, an indication of an attempted attack, an indication of a compromised system, an indication of a new system, an indication of a new service, an indication of a changed system, an indication of a changed service, or any other appropriate indication. In some embodiments, the system for an event driven query receives the indication from the client system and determines a scanning query based at least in part on the indication. In some embodiments, determining a scanning query based at least in part on the indication comprises determining a scan indicated by the indication (e.g., comprising an address, a port on the address, and a scan type to use). In some embodiments, determining a scanning query based at least in part on the indication comprises expanding the scanning query (e.g., determining additional addresses, ports, and/or scan types). The system for an event driven query then performs the scan. In some embodiments, the system for an event driven query provides a network status display. In various embodiments, the network status display comprises historical properly configured systems (e.g., systems known to be properly configured before the indication was received), historical vulnerabilities, properly configured systems determined from the scan, vulnerabilities determined from the scan, or any other appropriate network status display information.

FIG. 1 is a block diagram illustrating an embodiment of a network system. In the example shown, the network system comprises a system for scanning of Internet connected assets. The network system includes network 100. In various embodiments, network 100 comprises one or more of the following: a local area network, a wide area network, a wired network, a wireless network, the Internet, an intranet, a storage area network, or any other appropriate communication network. Administrator system 102 and scanning system 104 communicate via network 100. Administrator system 102 comprises a system for an administrator. In various embodiments, administrator system 102 comprises a system for an administrator to access applications on an application system, to access data on a database system, to indicate to scanning system 104 to perform a scan, to receive data from scanning system 104, to configure a network system (e.g., network system 106), to receive data from a network system, or for any other appropriate purpose. In some embodiments, administrator system 102 comprises an administrator system for a client system. In various embodiments, a client system comprises a system requesting a scan (e.g., from scanning system 104), a network system associated with a system requesting a scan, an administrator system (e.g., administrator system 102), or any other appropriate client system. In some embodiments, administrator system 102 comprises a processor and a memory.

Scanning system 104 comprises a system for scanning network systems. In some embodiments, scanning system 104 comprises a system for scanning network systems in response to a command from administrator system 102. In some embodiments, scanning system 104 comprises a system for scanning a set of network systems (e.g. network system 106, network system 108, network system 110, network system 112, network system 114, network system 116, network system 118, and network system 120). In some embodiments, scanning a network system comprises providing a payload to the network system and determining whether a response is received. In some embodiments, scanning a network system comprises scanning the network system using a follow-up probe based at least in part on a received response. In some embodiments, scanning system 104 comprises a system for providing a payload to all accessible network systems on all accessible ports and following up with an appropriate follow-up probe for any received responses that indicate more information is accessible. In some embodiments, scanning system 104 comprises a processor and a memory. Each network system of FIG. 1 (e.g., network system 106) comprises an Internet connected system (e.g., a desktop computer, a laptop computer, a smartphone, a tablet computer, a server system, an internet-of-things device, etc.). In various embodiments, the system of FIG. 1 comprises 8, 13, 197, 2222, one million, one hundred million, or any other appropriate number of network systems.

Figure 2:
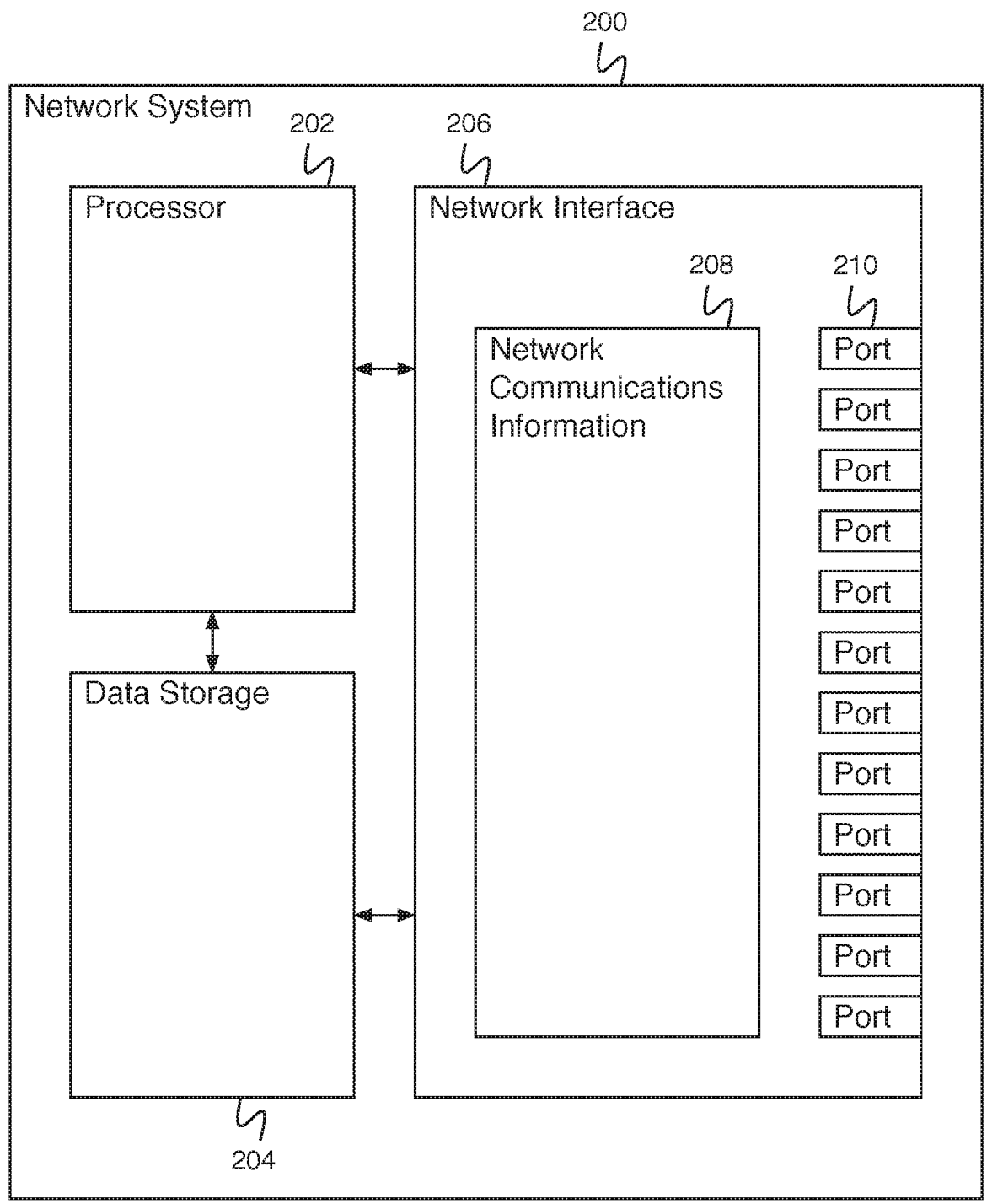
FIG. 2 is a block diagram illustrating an embodiment of a network system. I

FIG. 2 is a block diagram illustrating an embodiment of a network system. In some embodiments, network system 200 comprises a network system of FIG. 1 (e.g., network system 106). In the example shown, network system 200 comprises processor 202, data storage 204, and network interface 206. In some embodiments, network system 200 comprises an Internet connected asset (e.g., a desktop computer, a laptop computer, a smartphone, a tablet computer, a server system, an Internet-Of-Things device, or any other appropriate Internet connected asset). In various embodiments, processor 202 comprises a processor for executing instructions, processing data, responding to commands, etc. In various embodiments, processor 202 comprises a general-purpose processor, a microcontroller, a parallel processing system, a cluster of processors, or any other appropriate processor. In various embodiments, data storage 204 comprises a data storage for storing data, for storing instructions for processor 202, for storing configuration information, or for storing any other appropriate information. In various embodiments, data storage 204 comprises one or more of a volatile memory, a non-volatile memory, a magnetic memory, an optical memory, a phase-change memory, a semiconductor memory, a disc memory, a tape memory, or any other appropriate memory. Network interface 206 comprises a network interface for communicating with a network. In the example shown, network interface 206 comprises network communications information 208 and a plurality of ports (e.g., port 210). In various embodiments, network communications information comprises network communications software, network communications settings, network communications data, or any other appropriate network communications information. The plurality of ports comprises physical ports (e.g., plugs for connecting cables to network system 200) or virtual ports (e.g., virtual communications channels identified by a virtual port number). In some embodiments, network interface 206 comprises a network address (e.g., a network address assigned by an external network addressing authority). In some embodiments, communication with network system 200 is specified by indicating the network address of network 200 along with a port number. In some embodiments, some ports of network interface 206 are configured for communication and some are configured to not respond to communication. In some embodiments, some ports are associated with one or more specific communications protocols (e.g., HTTP, FTP, SSH, etc.). In some embodiments, network interface 206 comprises a set of network hardware (e.g., a modem) running a set of communications software that has been configured according to a set of communications specifications.

Figure 3:
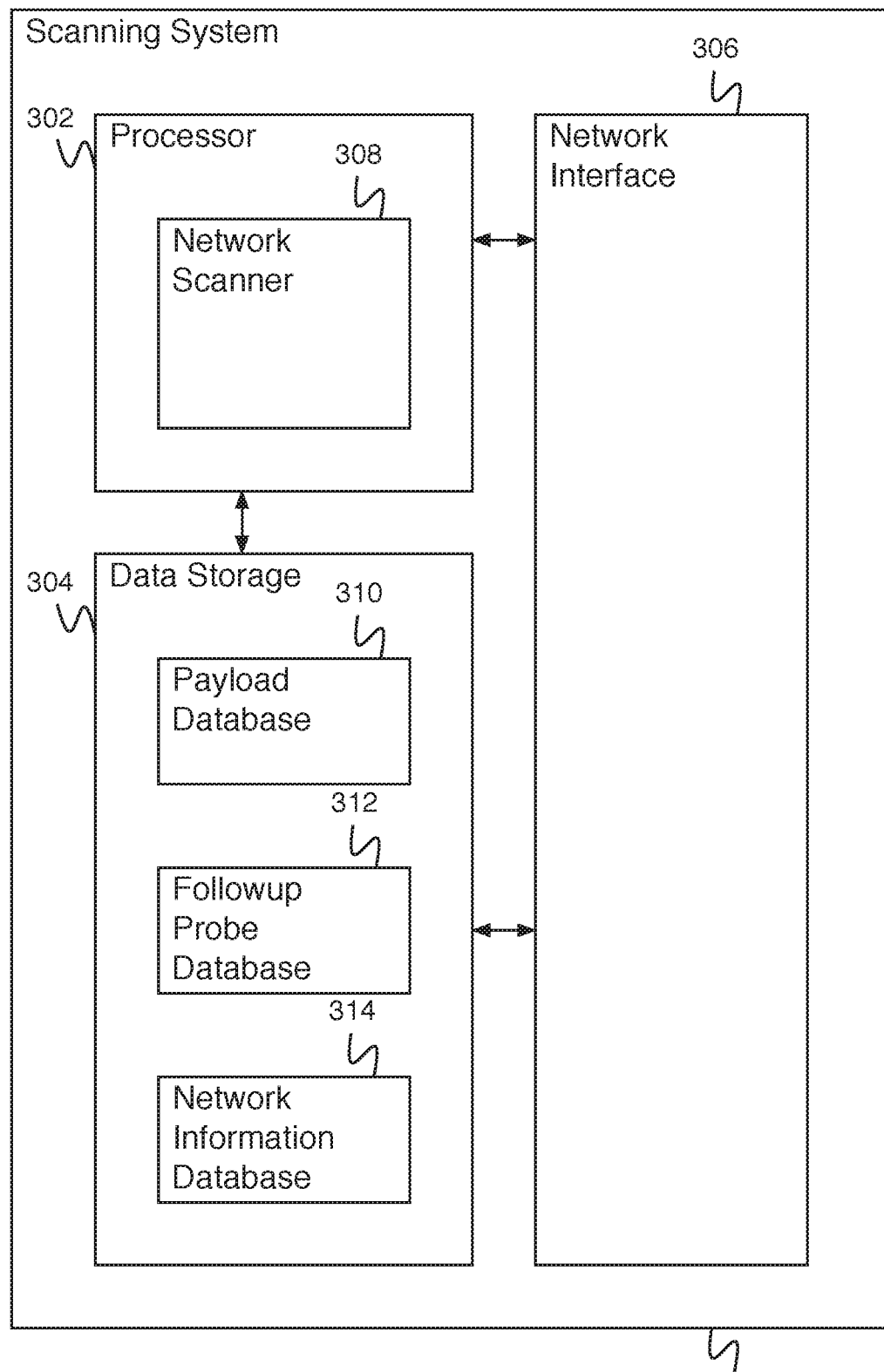
FIG. 3 is a block diagram illustrating an embodiment of a scanning system.

FIG. 3 is a block diagram illustrating an embodiment of a scanning system. In some embodiments, scanning system 300 comprises scanning system 104 of FIG. 1. In some embodiments, scanning system 300 comprises a server system. In the example shown, scanning system 300 comprises processor 302, data storage 304, and network interface 306. Processor 302 comprises a processor for executing instructions, processing data, responding to commands, etc. In various embodiments, processor 302 comprises a general-purpose processor, a microcontroller, a parallel processing system, a cluster of processors, or any other appropriate processor. In some embodiments, processor 302 comprises network scanner 308. In various embodiments, network scanner 308 comprises software and/or hardware implementing hierarchical scanning system functionality. In various embodiments, data storage 304 comprises a data storage for storing data, for storing instructions for processor 302, for storing configuration information, or for storing any other appropriate information. In various embodiments, data storage 304 comprises one or more of a volatile memory, a non-volatile memory, a magnetic memory, an optical memory, a phase-change memory, a semiconductor memory, a disc memory, a tape memory, or any other appropriate memory. In the example shown, data storage 304 comprises payload database 310 for storing payloads for providing to network devices. In some embodiments, a payload comprises a small data packet for probing a network device in order to elicit a response. Data storage 304 additionally comprises follow-up probe database 312 for storing follow-up probes for interacting with network devices. In some embodiments, a follow-up probe comprises software for interacting with a network device in order to determine information about the network device. In some embodiments, follow-up probe database 312 comprises a set of follow-up probes, each designed to interact with a network device in a specific way to retrieve data about the network device (e.g., establish a secure HTTP (HTTPS) connection and download an encrypted web page). In some embodiments, a follow-up probe is used to interact with a network device once it is determined that the follow-up probe is likely to succeed in receiving data from the network device. Data storage 304 additionally comprises network information database 314 for storing network information received as a result of interacting with network devices (e.g., using a payload or a follow-up probe). In some embodiments, network information is stored remotely (e.g., on a storage server, on a different hierarchical scanning system, on cloud storage, etc.). In the example shown, network interface 306 comprises a network interface for interacting with remote systems via a network. In various embodiments, network interface 306 comprises a network interface for providing a payload, for executing communications for a follow-up probe, for receiving network information, or for any other appropriate purpose. In some embodiments, network interface 306 comprises a network interface configured for high bandwidth communication.

Figure 4:
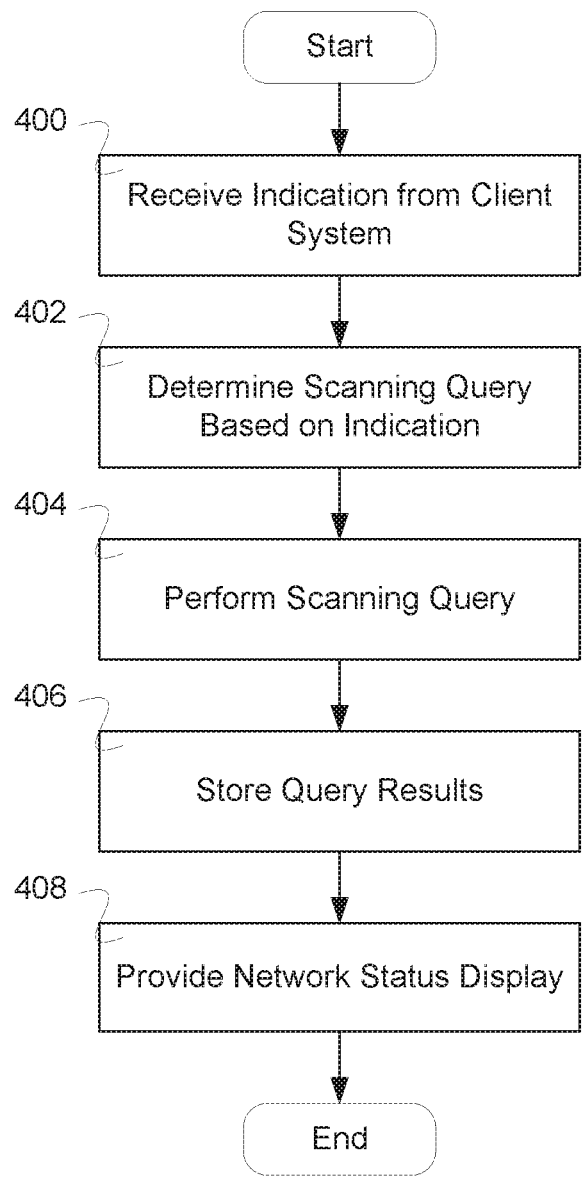
FIG. 4 is a flow diagram illustrating an embodiment of a process for triggered scanning.

FIG. 4 is a flow diagram illustrating an embodiment of a process for triggered scanning. In some embodiments, the process of FIG. 4 is executed by scanning system 104 of FIG. 1. In the example shown, in 400, an indication is received from a client system. In some embodiments, the client system comprises an administrator system (e.g., administrator system 102 of FIG. 1). In some embodiments, the indication comprises an indication of a change. In some embodiments, the indication comprises a manual indication (e.g., an indication initiated by a person). In various embodiments, a manual indication comprises an indication of a system change, an indication of a fixed vulnerability, an indication of a system problem, an indication of an attack (e.g., an attempted hack, a successful hack, etc.), or any other appropriate indication. In some embodiments, the indication comprises an automatic indication (e.g., an indication initiated by an automatic process of the client system). In some embodiments, an automatic indication comprises an automatic indication from a security information and event management (e.g., SIEM) system. In various embodiments, an automatic indication comprises an indication of a system change, an indication of unusual activity, an indication of a malware event, an indication of a system vulnerability, an indication of a lack of system maintenance, an indication of a stale system configuration, an indication of a manufacturer's or reseller's default configuration, or any other appropriate automatic indication. In various embodiments, the indication comprises an indication of one or more addresses (e.g., addresses where a change as occurred, addresses causing a problem, addresses experiencing unusual behavior, etc.), one or more ports (e.g., ports that require scanning, ports associated with services that require scanning, etc.), one or more scan types (e.g., scan types associated with a service that requires scanning), or any other appropriate scan information. In 402, a scanning query is determined based at least in part on the indication. For example, in the case of an indication of a default configured network appliance, as indicated by a telnet login screen that states no administrative password has been set, a scanning query could be generated to look for services running on other ports on the same IP address that are enabled and accessible in the manufacturer's default configuration of the device, but not present in a secure deployment of the device. In various embodiments, a scanning query is based at least in part on an address associated with the indication, on a port associated with the indication, on a scan type associated with the indication, or on any other appropriate indication information. In some embodiments, determining the scanning query based at least in part on the indication comprises expanding the query (e.g., expanding the query to include scanning additional addresses, additional ports, or using additional scan types past what is indicated directly in the indication). For example, if a vulnerable HTTP service running on port 8080 on IP address (e.g., 1.2.3.4) is changed to no longer be detected, a number of different query expansion algorithms can be run: 1) scan the IP address (e.g., 1.2.3.4) for other common ports associated with HTTP services (e.g., port 80, 8000 8081, 8082, 8888, etc.), 2) Scan all ports on the IP address (e.g., 1.2.3.4, 3, etc.) scan for the device changing IPs on a local network—for example, scan ports 8080 for new services running on IPs in 1.2.3.0/24, 4) scan for the device changing IPs on the global internet—for example, scan port 8080 on all IPv4 and/or IPv6 addresses and look for an identical system configuration, 5) Perform a combination of scanning new ports and services and IP addresses. In some embodiments, all IPs that share a public cryptographic key with a system with a malware infection indication are rescanned. In 404, the scanning query is performed (e.g., one or more systems are scanned as indicated by the scanning query). In 406, a query result is stored. For example, the results of the scanning query are stored in a database. The database stores query results over time so that a comparison can be made between results of scans at different times. In 408, a network status display is provided. In some embodiments, the network status display comprises a display of network vulnerabilities. In some embodiments, the network status display comprises a comparison of scan data with historical data.

Figure 5:
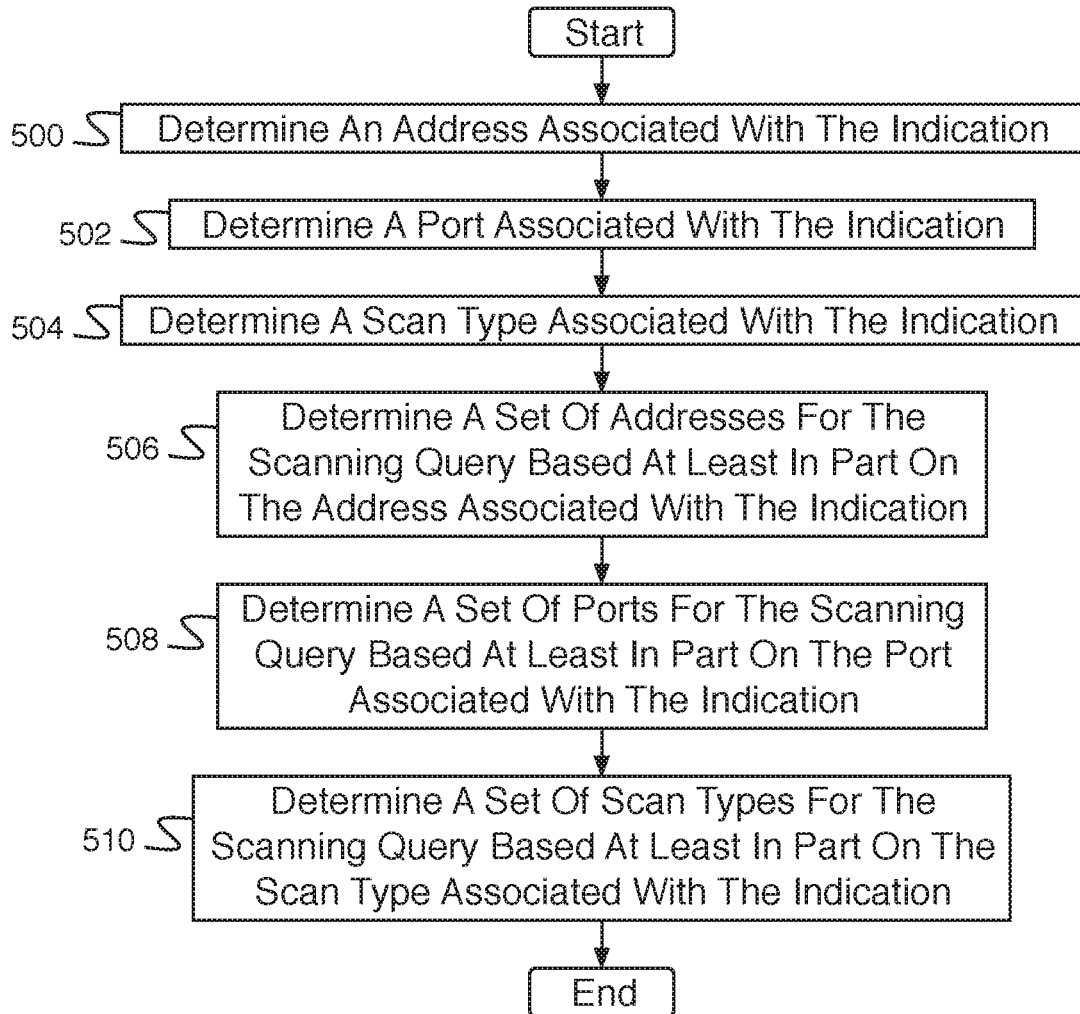
FIG. 5 is a flow diagram illustrating an embodiment of a process for determining a scanning query based at least in part on an indication.

FIG. 5 is a flow diagram illustrating an embodiment of a process for determining a scanning query based at least in part on an indication. In some embodiments, the process of FIG. 5 implements 402 of FIG. 4. In the example shown, in 500, an address associated with the indication is determined. In various embodiments, an address associated with an indication comprises an address of a modified system, an address of a system with a problem, an address of a system under attack, an address of a system receiving unusual traffic, an address of a system creating unusual traffic, an address of a system associated with a malware indication, or any other appropriate address. In 502, a port associated with the indication is determined. In various embodiments, a port associated with the indication comprises a port indicated to be modified (e.g., a newly closed port, a newly opened port, etc.), a port associated with a service having a problem, a port determined to be under attack, a port receiving unusual traffic, a port creating unusual traffic, or any other appropriate port. In 504, a scan type associated with the indication is determined. In various embodiments, a scan type comprises a scan type associated with an indicated change, a scan type associated with an indicated service, a broad scan type, a scan type for identifying malware, a scan type for determining a system extent, or any other appropriate scan type. In 506, a set of addresses for the scanning query are determined based at least in part on the address associated with the indication. In some embodiments, the set of address for the scanning query comprises the address associated with the indication and other addresses. In various embodiments, the set of addresses for the scanning query comprises a set of addresses nearby the address associated with the indication, a set of addresses on the same network as the address associated with the indication, a set of addresses configured in the same way as the address associated with the indication, or any other appropriate set of addresses. In 508, a set of ports for the scanning query based at least in part on the port associated with the indication is determined. In some embodiments, the set of ports for the scanning query comprises the port associated with indication and other ports. In various embodiments, the set of ports for the scanning query comprises a set of ports associated with the port associated with the indication, a set of ports nearby to the port associated with the indication, a set of ports associated with the indication, or any other appropriate set of ports. In 510, a set of scan types for the scanning query based at least in part on the scan type associated with the indication is determined. In some embodiments, the set of scan types for the scanning query comprises the scan type associated with indication and other scan type. In various embodiments, the set of scan types for the scanning query comprises a set of scan types associated with the port associated with the indication, a set of scan types similar to the scan type associated with the indication, a set of scan types associated with the indication, or any other appropriate set of scan types.

Figure 6:
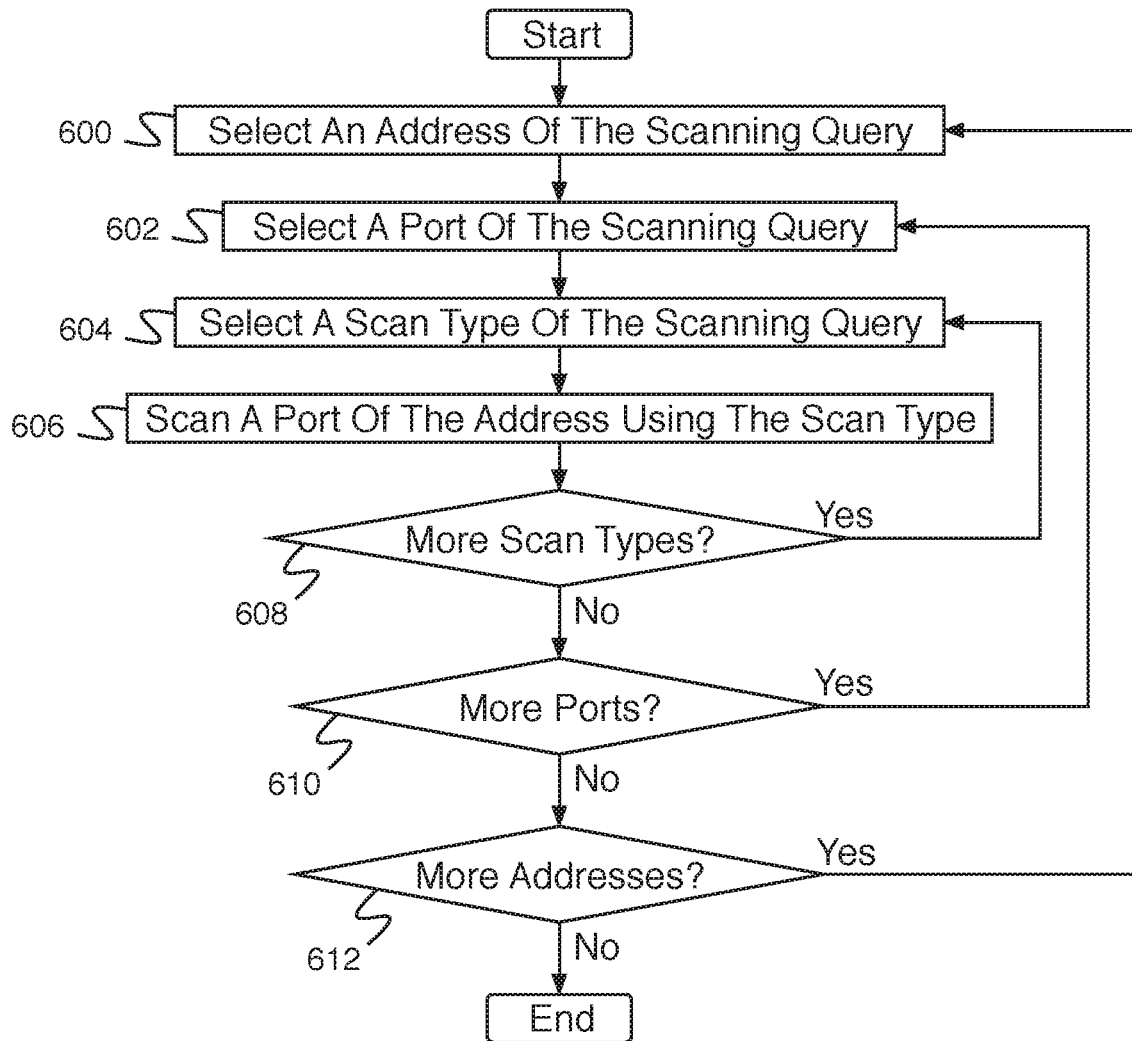
FIG. 6 is a flow diagram illustrating an embodiment of a process for performing a scanning query.

FIG. 6 is a flow diagram illustrating an embodiment of a process for performing a scanning query. In some embodiments, the process of FIG. 6 implements 404 of FIG. 4. In the example shown, in 600, an address of the scanning query is selected. In various embodiments, the address comprises a first address, a next address, a randomly selected address, a pseudorandomly selected address, or any other appropriate address. In 602, a port of the scanning query is selected. In various embodiments, the port comprises a first port, a next port, a randomly selected port, a pseudorandomly selected port, or any other appropriate port. In 604, a scan type of the scanning query is selected. In various embodiments, the scan type comprises a first scan type, a next scan type, a randomly selected scan type, a pseudorandomly selected scan type, or any other appropriate scan type. In 606, a port of the address is scanned using the scan type. In some embodiments, the scan type comprises a hierarchical scan and comprises scanning using a follow-up probe in the event the scan response indicates scanning using a follow-up probe. In various embodiments, the scan type comprises any appropriate number of communications involving the port of the address, other ports, other addresses, or any other appropriate scan targets. In 608, it is determined whether there are more scan types (e.g., more scan types of the scanning query to scan the port on the address with). In the event it is determined that there are more scan types, control passes to 604. In the event it is determined that there are not more scan types, control passes to 610. In 610, it is determined whether there are more ports (e.g., of the scanning query on the address to scan). In the event it is determined that there are more ports, control passes to 602. In the event it is determined that there are not more ports, control passes to 612. In 612, it is determined whether there are more addresses (e.g., of the scanning query). In the event it is determined that there are more addresses, control passes to 600. In the event it is determined that there are not more addresses, the process ends.

Figure 7:
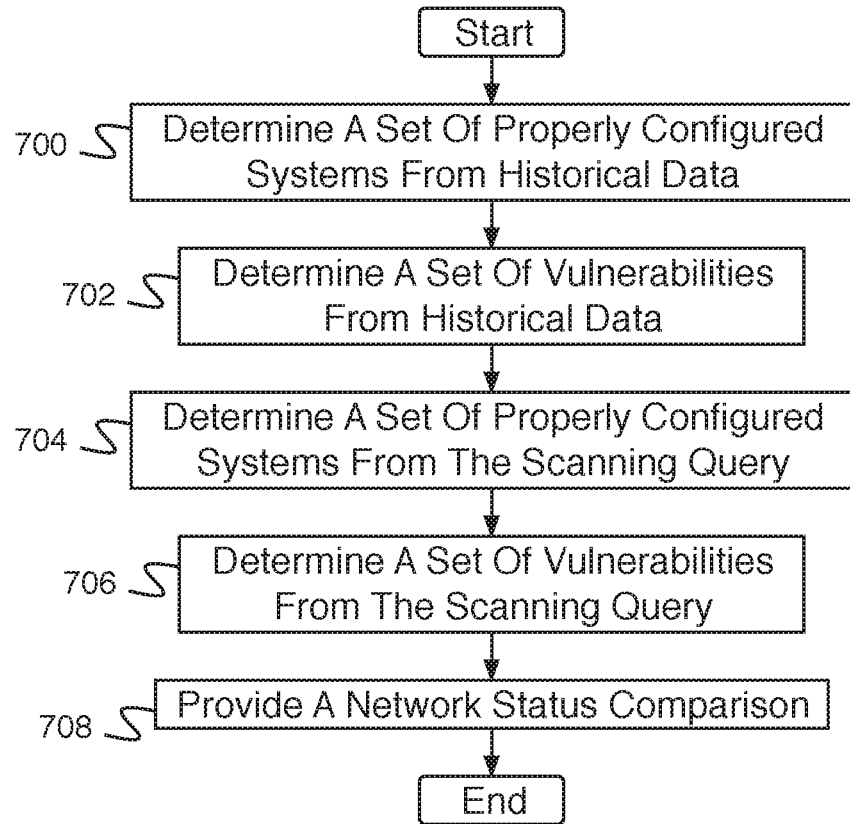
FIG. 7 is a flow diagram illustrating an embodiment of a process for providing a network status display.

FIG. 7 is a flow diagram illustrating an embodiment of a process for providing a network status display. In some embodiments, the process of FIG. 7 implements 408 of FIG. 4. In the example shown, in 700, a set of properly configured systems is determined from historical data. In some embodiments, historical data comprises a previous scan. In some embodiments, properly configured systems comprise systems without detected vulnerabilities. In various embodiments, the set of properly configured systems comprises a subset of a client network, a subset of addresses of the scanning query, all properly configured systems, or any other appropriate set of properly configured systems. In 702, a set of vulnerabilities is determined from historical data. In various embodiments, vulnerabilities comprise misconfigured systems, systems accessible that should not be accessible, vulnerabilities to a newly discovered system exploit, or any other appropriate vulnerabilities. In 704, a set of properly configured systems are determined from the scanning query (e.g., from the most recent scan data). In 706, a set of vulnerabilities is determined from the scanning query. In 708, a network status comparison is provided. In some embodiments, the network status comparison comprises a comparison of a network status before and after an indication was received.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for an event driven query, comprising:
an input interface configured to receive an indication of change from a set of network systems comprising Internet connected systems;
a processor configured to determine a scanning query based at least in part on the indication and perform the scanning query, wherein performing the scanning query comprises scanning within said set of network systems each Internet connected system by providing a payload to all accessible networks on all Internet accessible ports of each Internet connected system;
a payload database for storing said payloads, wherein each payload comprises a data packet, wherein said payloads are provided to network devices on all accessible networks on all accessible ports of each Internet connected system during the scanning query to elicit a response therefrom; and
a follow-up probe database for storing follow-up probes comprising software for interacting with a network device to determine information about the network device when a response to a probe is received from a network device for any received responses that indicate more information is accessible.

2. The system of claim 1, wherein the indication comprises a manual indication.

3. The system of claim 2, wherein the indication comprises a system change indication.

4. The system of claim 2, wherein the indication comprises a system problem indication.

5. The system of claim 2, wherein the indication comprises an attack indication.

6. The system of claim 1, wherein the indication comprises an automatic indication.

7. The system of claim 6, wherein the indication comprises a system change indication.

8. The system of claim 6, wherein the indication comprises an unusual activity indication.

9. The system of claim 6, wherein the indication comprises a malware event indication.

10. The system of claim 1, wherein determining the scanning query comprises determining an address associated with the indication.

11. The system of claim 1, wherein determining the scanning query comprises determining a port associated with the indication.

12. The system of claim 1, wherein determining the scanning query comprises determining a scan type associated with the indication.

13. The system of claim 1, wherein determining the scanning query comprises expanding the scanning query.

14. The system of claim 13, wherein expanding the scanning query comprises adding addresses to the scanning query.

15. The system of claim 13, wherein expanding the scanning query comprises adding ports to the scanning query.

16. The system of claim 13, wherein expanding the scanning query comprises adding scan types to the scanning query.

17. The system of claim 1, wherein performing the query comprises scanning
one or more address of an Internet connected system at one or more ports using one or more scan types.

18. The system of claim 1, wherein the processor is further to provide a network status display.

19. The system of claim 18, wherein the network status display comprises a comparison of a network status before and after the indication was received.

20. A method for an event driven query, comprising:
receiving an indication of change from a set of networks comprising Internet connected systems;
determining, using a processor, a scanning query based at least in part on the indication;
performing the scanning query, wherein performing the scanning query comprises scanning within said set of networks each Internet connected system by providing a payload to all accessible networks on all accessible ports of each Internet connected system;
providing a payload database for storing said payloads, wherein each payload comprises a data packet;
providing said payloads to network devices on all accessible networks on all accessible ports of each Internet connected system during the scanning query to elicit a response therefrom;
storing, in a follow-up probe database, follow-up probes comprising software;
sending a follow-up probe to a network device when a response to a probe is received from the network device for any received responses that indicate more information is accessible; and
said follow-up probes interacting with a network device to determine information about the network device.

21. A computer program product for an event driven query, the computer program product being embodied in a non-transitory computer readable storage medium and comprising computer instructions for:
receiving an indication of change from a set of networks comprising Internet connected systems;
determining a scanning query based at least in part on the indication;
performing the scanning query, wherein performing the scanning query comprises scanning within said set of networks each Internet connected system by providing a payload to all accessible networks on all accessible ports of each Internet connected system;
providing a payload database for storing said payloads, wherein each payload comprises a data packet;
providing said payloads to network devices on all accessible networks on all accessible ports of each Internet connected system during the scanning query to elicit a response therefrom;
providing a follow-up probe database containing a plurality of follow-up probes comprising software;
sending a follow-up probe to a network device when a response to a probe is received from the network device for any received responses that indicate more information is accessible; and
said follow-up probes interacting with a network device to determine information about the network device.

* * * * *